June 27, 1944.    T. W. MACOMBER    2,352,334
AIRCRAFT CONTROL SYSTEM
Filed June 9, 1942    2 Sheets-Sheet 1

INVENTOR
Thomas W. Macomber
BY
ATTORNEY

June 27, 1944.  T. W. MACOMBER  2,352,334
AIRCRAFT CONTROL SYSTEM
Filed June 9, 1942   2 Sheets-Sheet 2

INVENTOR
Thomas W. Macomber
BY
ATTORNEY

Patented June 27, 1944

2,352,334

UNITED STATES PATENT OFFICE 2,352,334

AIRCRAFT CONTROL SYSTEM

Thomas Wesson Macomber, Mountain View, Calif.

Application June 9, 1942, Serial No. 446,341

12 Claims. (Cl. 244—85)

(Granted under the act of March 3, 1883, as amended April 30, 1928; 370 O. G. 757)

This invention relates to apparatus for controlling the flow of working medium to a fluid pressure actuated servo-motor, and more particularly to a control system for a fluid pressure actuated servo-motor which is connected to operate a control surface of an aircraft.

The subject matter of this application comprises an improvement on the system disclosed and described in the United States patent application of J. S. W. Davidsen, Serial No. 417,433, filed November 1, 1941.

It is an object of this invention to provide a booster control system for an aircraft in which the assisting force supplied by a servo-motor is maintained at a fixed ratio to the manual force applied by the pilot, so that the "feel" to the pilot will be maintained at all times in a definite proportion to the total load.

In the aircraft booster control systems of the type disclosed in the United States patent application Serial No. 417,433 referred to above, the servo-motor for supplying the booster or assisting force comprises a power cylinder having a piston reciprocable therein to which a differential pressure is applied at its opposite sides. The low pressure side of the cylinder is connected to a return or exhaust line of the fluid supply system which is usually provided with a vent to the atmosphere. Consequently, the low pressure side of the cylinder is subjected to the pressure of the atmosphere. This atmospheric pressure to which the low pressure side of the cylinder is subjected varies with changes in the altitude of the aircraft. A decrease in pressure on the low pressure side of the piston has the same effect upon the control surface as would an increase in pressure applied to the high pressure side of the piston and causes the assisting force supplied by the power cylinder to be increased.

It is an object of this invention, therefore, to provide a control system in which the boost force is delivered in a fixed proportion to the total load independently of the pressure effects of the altitude. In the device embodying the features of this invention which will be described in detail presently, the control valve which governs the admission of actuating fluid under pressure maintains a differential in fluid pressure on the opposite sides of the power piston of the servo-motor. This differential in pressure is in a fixed proportion to the operator's force and retains this fixed proportion independently of variations of the surrounding external pressure or pressure variations of the fluid supply.

In the control systems of the type referred to above, the fluid admitted to the fluid actuated servo-motor is controlled by a manual force which is applied by the operator to the pivoted control stick and transmitted by means of a cable loop transmission and fluid coupling means directly to the control surface. Upon the application of a manual force to the pivoted control stick, the tensional force in one side of the cable loop is increased, whereas the tensional force in the other side of the cable loop transmission is simultaneously decreased. Thus, the manual force applied to the control surface is equal to the differential of the force in the control cables at opposite sides of the cable loop. It is also a specific object of this invention to utilize this differential between the tensional forces in the cable loop to operate a piston valve for controlling the flow of fluid under pressure to said fluid actuated servo-motor.

It is also a further object of this invention to provide a booster control system in which a back pressure is exerted so as to oppose the operation of the valve which controls the flow of working medium to said servo-motor, and which back pressure is proportional to the pressure differential actuating the servo-motor of said control system. It will be apparent that when the back pressure is applied to a valve controlled by the difference in tensional forces existing in the two sides of the cable loop transmission, the force actuating the valve must be sufficient to overcome the back pressure and will be equal to the differential between the tensional forces in the cable sides less the force exerted by the back pressure. Since the latter force is proportional to the assisting force, the operator will sense the reaction of the control surface by applying a manual effort which maintains a fixed proportion to the total load.

Other objects and advantages will become apparent from the specification as the specific features of certain preferred embodiments of this invention are hereinafter described in detail in connection with the accompanying drawings, in which.

Figure 1:
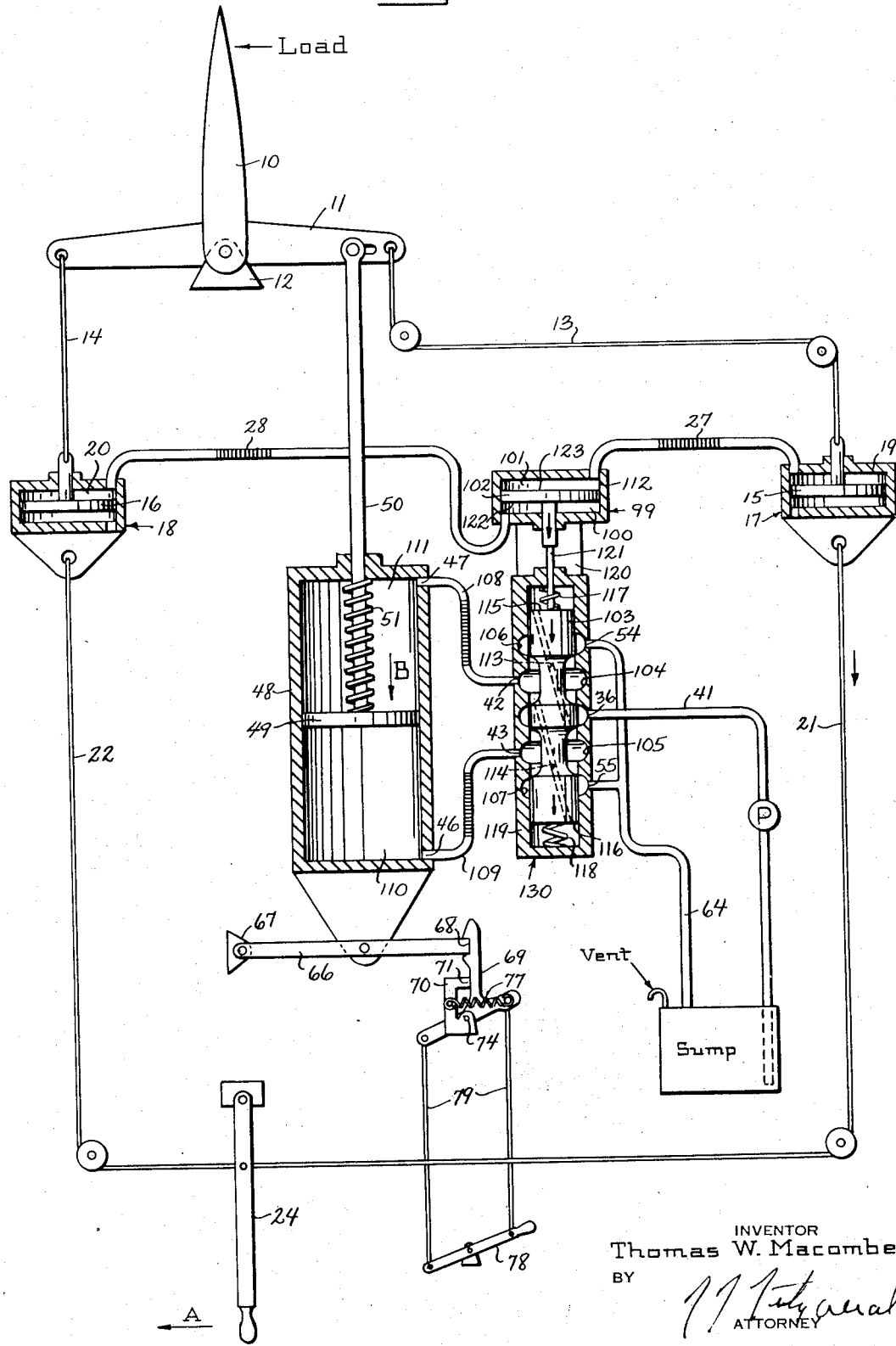
Fig. 1 is a schematic view of a preferred form of this invention.

Referring now to Fig. 1 of the drawings, the reference numeral 10 designates a control surface of an aircraft such as an aileron, elevator or rudder. As shown, this control surface 10 is pivoted to a supporting structure 12. The control surface 10 is adapted to be positioned about its pivot by the moment of force applied to the control horn 11 secured to the control surface in a manner well known to the art. The cables 13, 14, 21 and 22 constitute a cable loop transmission system for applying the torque to the control horn. Cables 13 and 14 each have an end secured respectively to the control horn at or near its extremities with the other end of each cable secured respectively to the pistons 15 and 16 of the fluid couplings 17 and 18 which are connected in each side of the cable loop transmission. The fluid couplings 17 and 18 each include in addition to its movable piston 15 and 16 an enclosing cylinder 19 and 20 which forms a fluid-tight chamber about its respective piston. The control cables 21 and 22 have an end secured to their respective cylinders 19 and 20 with the other end of each secured to the pivoted control stick 24. A suitable low viscous fluid such as kerosene or alcohol is contained within each fluid coupling within the space defined by the cylinder and piston. The manual force applied to the control stick 24 increases the tension in one side of the cable loop and simultaneously decreases the tensional force applied to the other side of the cable loop. This differential in tensional force is transmitted to the fluid retained within the fluid couplings connected in each loop side and directly to the control horn 11, and constitutes the manually applied moment of force tending to actuate the control surface 10. Flexible pressure hose 27 and 28 connect the interior of each of these fluid couplings to the differential pressure actuated mechanism 99. This differential pressure actuated mechanism, as illustrated, consists essentially of a pressure differential cylinder 112 having a piston 102 reciprocable therein. This piston is connected to the valve piston 103 of the balanced regulator control valve 130 by means of the rigid coupling member 121.

If it is assumed that the manual force applied to the control stick 24 is in the direction indicated by the arrow A, the fluid pressure in the coupling 17 will be increased; whereas, the fluid pressure in the coupling 18 will be simultaneously decreased. This pressure differential which exists in the fluid couplings 17 and 18 is transmitted to the differential cylinder 112 so that a pressure equal to the fluid pressure in each of these couplings is applied at opposite sides of the piston 102. The application of such a pressure to the piston 102 will cause the piston to be initially displaced within its cylinder 112 and in a direction indicated by the arrow. As illustrated, the interior of the fluid coupling 18 is connected to the chamber 100 so that the fluid pressure within the coupling 18 will act upon the surface area 122 of the movable piston 102. Likewise, the fluid pressure existing in the fluid coupling 17 will be transmitted to the chamber 101 to act upon the surface 123 of the piston 102. Movement of the piston 102 is transmitted through the rigid connection 121 to the piston 103 of the control and regulating valve 130 which is fixed with respect to the differential by means of the member 120. Movement of the piston 103 in the indicated direction will uncover the ports 36 and 55 formed in the housing 119. Fluid is admitted under pressure from the pump P by means of fluid conduit 41 to the intake orifice or port 36. The ports or orifices 42 and 43 communicate respectively with the grooved cylindrical chambers indicated at 104 and 105 of the drawings. As the piston 103 is moved upwardly or downwardly, as the case may be, the fluid pressure at the inlet 36 will flow into either of the two chambers 104 and 105, depending upon the direction of movement of the piston 103, and this fluid pressure will be conducted from its respective chamber by means of the conduits 108 or 109 to the inlet orifice 47 or 46 of the power cylinder 48. Movement of the piston 103 also uncovers substantially simultaneously either of the exhaust ports 54 or 55 which lead to the return line 64 of the fluid supply system. These ports 54 and 55 formed in the cylindrical housing 119 communicate respectively with the grooved cylindrical recess 106 and 107 formed in the interior wall surface of the cylindrical housing. Passageways 113 and 114 are formed in the piston so as to lead respectively from the chambers 105 and 104 to the top surface 115 and the bottom surface 116 of the piston 103. Consequently, fluid pressure applied to the chambers 104 and 105 will be transmitted by means of the passageways 114 and 113 to the opposite end surfaces respectively of the piston 103 whereby a force proportional to the pressure differential existing in the chambers 111 and 110 of the power cylinder 48 will oppose the movement of the piston valve 103.

The piston 103 is retained in the neutral position illustrated by the action of the balanced compressional springs 117 and 118 which are positioned at each end thereof when the forces acting on the differential piston 102 are balanced by the forces acting on surfaces 115 and 116 of piston 103. In this neutral position all of the above mentioned ports are closed.

The fluid pressure, as controlled by the regulating valve 130, is thus transmitted to opposite sides of the piston 49 movable within the power cylinder 48 and rigidly connected to the control horn 11 by means of the connecting rod 50. This piston 49 is maintained in a neutral position with respect to the power cylinder when no fluid pressure is applied thereto by means of the tensional and compressional spring 51.

The power cylinder 48 is pivotally supported to the bar shaped bracket member 66 which is in turn pivoted to the supporting structure 67 so that its free end may engage a bar receiving recess 68 formed in the pivoted latch 69. The support 70 for this latch has an abutment 71 projecting therefrom to engage the latch and prevent inward movement thereof by the action of the tension spring 77 shown secured to the latch and to its supporting structure. The spring 77 is positioned so as to be radially offset or out of alignment with the pivot 74 whereby the spring will hold the latch in the open position when the latch has been moved by the pivoted lever 78 and the operating cables 79 to a position wherein the axis or center line of the spring has passed below the pivot 74. The stop 71 for the latch 69 is provided to facilitate reengagement by preventing the latch from swinging so far to the left when the bar 66 is disengaged and inclined to a position other than as shown to prevent reengagement.

The use of the manually releasable clamping device disclosed in combination with the power cylinder 48, or other servo-motor, permits the operator to free the power cylinder so that the control surface can be operated manually without interference from the cylinder or any other other part of the boost device. In the event of failure or sticking of any part of the booster mechanism, including the power cylinder itself, and the operator desires to free the controls from the booster mechanism, he may disconnect the entire mechanism simply by disengaging the latch 69 by manipulating the lever 78. In this event the pilot or operator obtains the maximum "feel" since the power cylinder 48 is free to turn about its pivot and the pivot of its supporting bar without interfering with the direct application of the pilot's manual effort.

Figure 2:
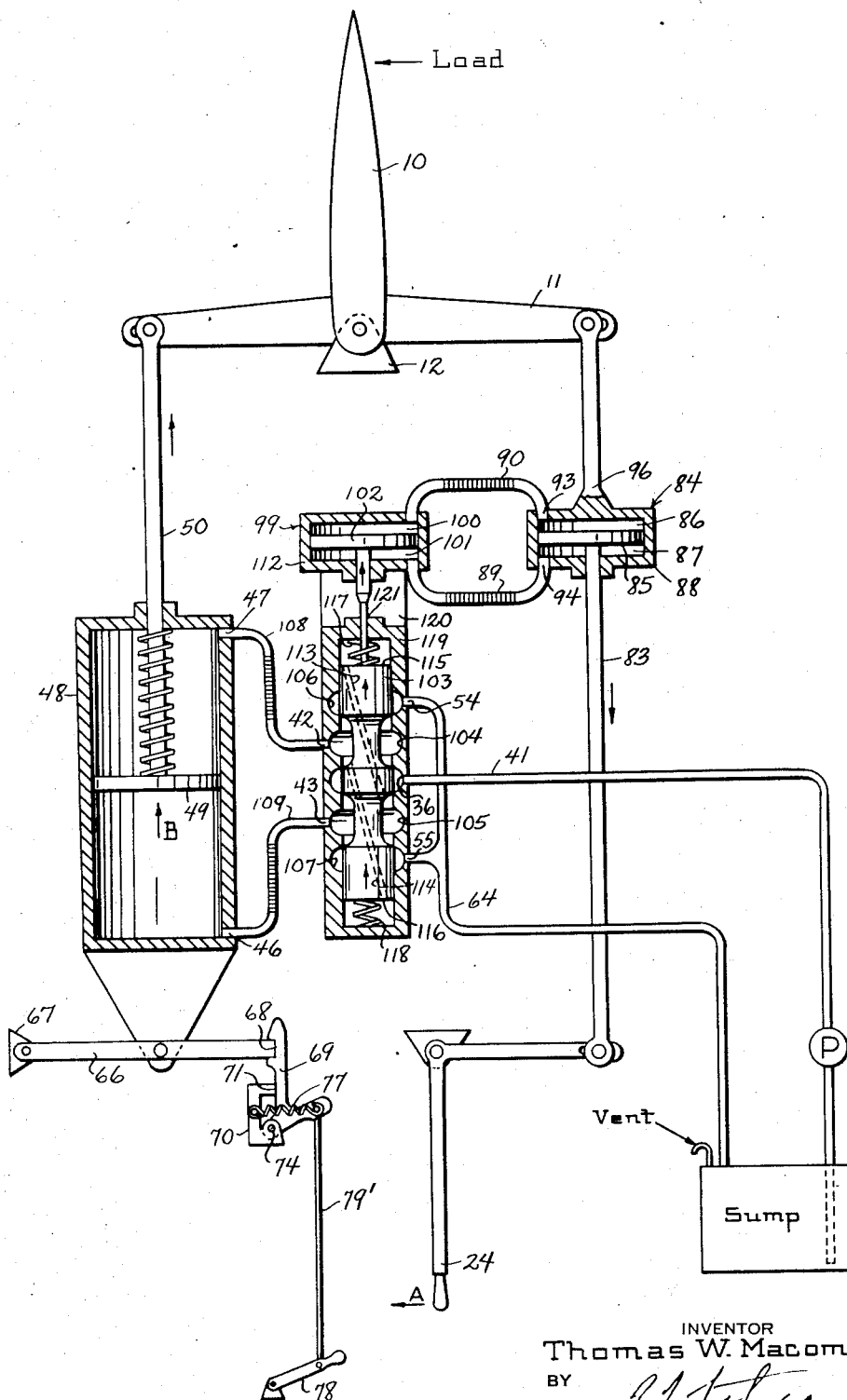
Fig. 2 is a schematic view of a modification illustrated in the invention as applied to a push-pull aircraft control system.

Fig. 2 discloses a modification of this invention wherein a push-pull type of control system is used. As illustrated, the control system has a single control element 83 secured to the pivoted control stick 24 for delivering the push-pull forces applied by the operator on to the control horn 11 through the fluid coupling member 84. This fluid coupling consists of a centrally disposed piston 85 which, as illustrated, is connected to the control element 83. The cylinder 88 surrounds the piston 85 so as to form therewith two fluid-tight chambers 86 and 87. This cylinder 88 is connected by means of the control rod 96 to the control horn 11 and transmits the push-pull forces applied to the control stick 24 through the fluid contained within the chamber 86 and 87 to the opposite end surfaces of the cylinder on to the control surface 10. Flexible hose 90 and 89 connect the outlet passageway 93 and 94 formed in the cylinder 88 of the fluid coupling at opposite sides of the piston 85 to the chambers 100 and 101 of the pressure differential valve actuating means 99 to control the movement of the piston 102 contained within the cylinder 112. The remaining portion of the control system herein illustrated is identical in construction with that illustrated in Fig. 1 except for the fact that a push-pull rod 79' is utilized to transmit movement of the lever 78 on to the pivoted latch 69. Consequently, similar reference numerals have been used to indicate similar parts.

The operation of the device with particular reference to the preferred embodiment as illustrated in Fig. 1, is as follows:

The application of a force by the operator to the control stick 24 in a direction A in an effort to counteract the "load" applied to the control surface 10 or to move the control surface results in increasing the tensional forces in the cable 21 and simultaneously decreasing the initial tensional forces in the control cable 22. The increase in the tensional forces in the cable 21 causes an increase in the pressure of the fluid contained within the coupling 19 which is tied into this side of the cable loop. Likewise, the reduction in tensional force of the cable 22 causes a reduction of the pressure of the fluid contained within the coupling member 20 which is tied into the side of the cable loop containing the cable 22. The fluid pressure in each of these couplings 19 and 20 is transmitted by means of the flexible hose connections 27 and 28 to the respective chambers 101 and 100 formed by the cylinder 112 and the piston 102 of the differential pressure actuated operating means for valve 130. The application of this differential pressure to the piston 102 at its opposite sides produces unequal forces acting thereon which are sufficient to move the piston downwardly as indicated by the arrow. This piston 102 is connected by means of the rigid coupling member 121 to the piston 103 of the valve 130. Consequently, the piston 103 is movable downwardly with the piston 102.

Movement of the piston 103 uncovers ports 36 and 55 formed in the housing 119. The port 36 permits fluid to flow from the supply line 41 into the grooved cylindrical cavity 104. A port 42 formed within the housing 119 communicates with the cylindrical cavity 104 and with a fluid conduit 108 leading from the cavity 104 to the inlet 47 of the power cylinder 48. It is obvious, therefore, that movement of the piston 103 in the indicated direction opens a passageway for fluid under pressure to flow into the chamber 111 of the power cylinder 48. Likewise, downward movement of the piston 103 opens the port 55 connected to the return line 64 of the fluid supply source and opens a passageway leading from the chamber 110 of the power cylinder 48 through the fluid conduit 109 through the port 43 and the groove recess 105. Consequently, an exhaust passageway is formed from the chamber 110 to the low pressure return line 64.

The pressure differential existing upon opposite sides of the piston 49 results in an unbalanced force acting on the piston in the direction of the arrow B. This unbalanced force transmitted through the rod 50 and arm 11 in the indicated direction assists the operator in counteracting the load applied to the control surface or in moving the said control surface. A pressure proportional to the pressure differential between chambers 110 and 111 of the power cylinder is applied as a back pressure to the piston 103 of the valve 130; i. e., the pressure in the chamber 111 and the groove cavity 104 is transmitted by means of the passageway 114 indicated by means of the dotted lines on the drawings to the lower end face 116 of the piston 103. Similarly, the pressure in the low pressure chamber 110 is transmitted through the grooved cavity 105 and the passageway 113, which is indicated in the drawings by means of the dotted lines, to the top end face 115 of the piston 103. This differential fluid pressure acting upon the opposite end faces 115 and 116 of the piston 103 produces a resultant force acting upon the piston 103 tending to oppose the differential force acting upon the piston 102 and tending also to aid in returning the piston 103 to its neutral position. This constitutes the back pressure which is proportional to the pressure differential actuating the servo-motor. The flow of fluid through the control valve 130 will continue until the difference in force on the end faces 115 and 116 of the piston 103 is balanced with the differential forces on the piston 102. Thus the valve will function as a pressure regulator as well as a control valve for the admission of fluid to the power cylinder 48.

When these differential forces which act on the piston 103 are balanced, the piston 103 will be returned to its neutral position by the action of the compressional springs 117 and 118. The flow of pressure fluid to the boost cylinder will be cut off after the power cylinder has provided the necessary force to assist the operator in positioning the control surface or counteracting the load applied thereto. The force so applied by the power cylinder 48 will be in a fixed ratio to the manual force exerted by the operator on the control lever 24. This proportion is governed by the dimensions of the apparatus.

If the operator were to slightly reduce the manual force applied to the control lever 24, the reduction in the differential pressure applied to the piston 102 would permit the piston 103 to move slightly upwardly and cause the fluids governed by this piston to reduce slightly the force exerted on the power piston 49. Thus, the system is directly responsive to either an increase or a decrease in the operator's force. If the external load on the control surface 10 were to be reduced slightly, the tension on the control cable 13 would also be reduced and the tension on the control cable 14 would be increased. This change in tensional forces in the control cables causes a reduction in the differential pressure acting on the opposite faces of the piston 102 and allows the piston 103 of the regulator valve 130 to move upwardly to reduce slightly the fluid force exerted on the power cylinder 49. This reduction in the cable tension 13 is also transmitted to the cable 21 which is connected thereto through the fluid coupling and is thus transmitted to the operator. Hence the operator feels the change in load as a change in the muscular effort required.

Simultaneously with the above action, when the external load on the control surface 10 is reduced, the tension in rod 50 and the pressure in chamber 111 of the power cylinder is reduced, and the pressure in chamber 110 is increased. This change in pressure, transmitted to ends 116 and 115 of the piston 103, tends to move the piston 103 downwardly, in opposition to the simultaneous tendency of the reduction in tension in cable 13 to move piston 103 upwardly. Since the proportion of the areas of faces 122 and 123 of piston 102 to the areas of piston faces 115 and 116 of piston 103 is greater than the ratio of the pressure differentials in cylinders 48 and 99 by the factor of the boost ratio, then the force developed on piston 102 by the change in load will overcome the force developed on piston 103. Hence the differential force in the control cables will govern the action of the control valve at all times, and the system will be stable.

In the illustrated embodiments of this invention the effective areas of some of the pistons are reduced by the piston rods. The cross sectional areas of these piston rods can be adjusted to make the boost ratio the same for both directions of operation. This is shown in the drawings wherein the rod 121 has a different area in the differential cylinder 112 than its area in the regulating valve housing 119. Of course, there are other means of accomplishing the same results, such as extending the piston rods out of both ends of the cylinders and valves.

According to the provisions of the patent statutes, the preferred forms of this invention have been illustrated and described, with the understanding, however, that certain modifications may be made without departing from this invention. That is, this invention may be practiced otherwise than specifically illustrated and described and still remain within the scope of the appended claims.

The invention herein described may be manufactured and used by or for the Government of the United States of America for governmental purposes without payment of any royalties thereon and therefor.

I claim:

1. In a system for supplying an assisting force to aid in positioning a control surface of an aircraft, fluid coupling means transmitting a manually applied force directly to said control surface, a power cylinder having a movable piston connected to said control surface for supplying a force assisting said manual force in moving said control surface, a supply source of fluid under pressure, a low pressure return line therefor, a valve and valve casing, means for conducting fluid under pressure from said supply source to said valve casing and for conducting fluid pressure therefrom to said power cylinder at a selective side of said piston, conduit means connecting said valve casing to said low pressure return line, differential pressure actuated means for moving said valve within said casing for controlling the flow of fluid to said power cylinder at a selected side of said piston and connecting the cylinder at the opposite side of said piston to said low pressure return line, fluid conduits connecting said fluid coupling means to said differential pressure actuated means so that the difference in pressure in said coupling means is transmitted to said valve moving means, and means causing a back pressure to be exerted opposing the operation of said valve by said differential pressure actuated means, said back pressure being proportional to the pressure differential between the fluid pressure at said inlet and the pressure in said return line whereby the differential pressure required to actuate said valve must overcome a force proportional to the force actuating said power piston so that the reaction of the control surface to the total forces applied thereto will be sensed by the operator by the increase or decrease in manual pressure transmitted through said fluid couplings.

2. In a system for supplying an assisting force to aid in positioning a control surface of an aircraft, fluid coupling means transmitting a manually applied force directly to said control surface, a power cylinder having a movable piston connected to said control surface for supplying a force assisting said manual force in moving said control surface, a supply source of fluid under pressure, a valve and valve casing having inlet and outlet ports, conduit means for supplying fluid from said supply source to the inlet port in said valve casing and conducting fluid from the outlet port thereof to said power cylinder, differential pressure actuated means for moving said valve within its casing to control the flow of fluid to said power cylinder, fluid conduits connecting said fluid coupling means to said differential pressure actuated means so that the differential pressure existing in said coupling means will be transmitted to said valve actuating means, and means causing said fluid pressure applied to said power cylinder for moving said piston to exert a back pressure on said valve so that the differential pressure required to actuate said valve must be sufficient to overcome a force proportional to the assisting force supplied by said power cylinder whereby the operator will sense the reaction of said control surface to the assisting force applied thereto by the increase or decrease in pressure applied through said fluid coupling means.

3. In a system for supplying an assisting force to aid in positioning a control surface of an aircraft the combination of a cable transmission loop having a manually actuated control member, a fluid coupling means having separate pressure chambers and said control surface tied therein so that a manual force applied to said control member will be transmitted through said fluid coupling directly to said surface by increasing the fluid pressure in one chamber and decreasing the fluid pressure in the other chamber as the tensional force in one side of the loop is increased simultaneously with a decrease in the tensional force in the other side of the loop, said high and low pressures being proportional to said high and low tensional forces in said loop and determined by the direction of the said manual force, a fluid actuated power cylinder for supplying said assisting force having a piston operatively connected to said control surface and movable within said cylinder when a pressure differential is applied to its opposite sides, valve means controlling the flow of pressure fluid to said power cylinder, a differential pressure actuated means for operating said valve comprising a casing having a second piston reciprocable therein, and fluid conductive means respectively connecting the high and low pressure chambers of said coupling means to said casing at the opposite sides of said second piston whereby the total force operating said valve will be proportional to the difference in tension in the opposite sides of said cable loop.

4. The combination defined in claim 3 characterized further by the addition thereto of means for exerting a force opposing the operation of said valve by said differential pressure actuated means, said force being a fixed ratio of said assisting force.

5. In a system for supplying an assisting force to aid in positioning the control surface of an aircraft the combination of fluid coupling means having separate fluid-tight chambers for transmitting a manual force directly to said control surface, the separate chambers of said fluid coupling means having high and low fluid pressure contained therein when transmitting a manual force on to said control surface, the high and low pressure chambers being determined by the direction of the manual force and proportional to the magnitude thereof, fluid actuated means operatively connected to said control surface for supplying said assisting force, a supply source of fluid under pressure, valve means controlling the flow of fluid from said source to said fluid actuated means, means actuated by a differential pressure for operating said valve means, fluid conduit means connecting the high and low pressure chamber of said fluid coupling means to said differential pressure actuated means whereby the assisting force will be governed by the difference in fluid pressure.

6. In a system for supplying an assisting force to aid in positioning a control surface of an aircraft, a manually actuated member, a cable transmission connecting said manually actuated member to said control surface for transmitting the manual force applied to said member directly to said control surface, said cable transmission including a pair of equally tensioned cables to which unequal tensional forces are applied when a manual force is transmitted to said control surface, the tensional forces in said cables increasing and decreasing in accordance with the magnitude and direction of the manual force applied to said member, a supply source of fluid under pressure, differential fluid pressure actuated power means operatively connected to said control surface for supplying said assisting force, and valve means interposed between said fluid supply source and said power means, said valve means being operated by a force equal to the differential in tensional forces in said cables less a force proportional to the differential fluid pressure applied to said power means for controlling the flow of pressure fluid thereto, whereby the total force applied to said control surface will be a fixed ratio of said manual force.

7. In a system for supplying an assisting force to aid in positioning a control surface of an aircraft the combination of a cable transmission loop having a manually actuated member and said control surface tied therein, whereby the manual force applied to said member will be transmitted to said control surface by increasing the tensional force in one side of said cable loop and simultaneously decreasing the tensional force on the other side of said cable loop, said high and low tension sides being determined by the direction of the manual force, a supply source of fluid under pressure, differential fluid pressure actuated power means operatively connected to said control surface for supplying said assisting force and valve means interposed between said fluid supply source and said power means, said valve means being operated by a force equal to the differential in tensional forces in said cable loop sides less a force proportional to the differential fluid pressure applied to said power means for controlling the flow of pressure fluid thereto, whereby the reaction of the control surface to the total forces applied thereto will be sensed at all times by the operator in a fixed ratio of the total load.

8. In a system for supplying an assisting force to aid in positioning the control surface of an aircraft, the combination of fluid coupling means for transmitting an applied manual force directly to said control surface, fluid actuated means operatively connected to said control surface for supplying said assisting force, a supply source of fluid under pressure, valve means controlling the flow of fluid from said source to said fluid actuated means, a differential pressure actuated means controlling said valve, fluid conduits connecting said fluid coupling means to said pressure differential actuated means whereby a pressure differential proportional to the pressure differential existing in said fluid coupling means will actuate said valve controlling means upon the application of a manual force tending to move said control surface about its pivot.

9. In a booster control system for aircraft having a control surface, the combination comprising, fluid actuated servo-motor means operatively connected to said control surface, manually operated means for transmitting a manual force to said control surface including a fluid coupling, a source of fluid under pressure, valve means for controlling the flow of fluid from said source to said fluid servo-motor means, a differential pressure actuated means for controlling said valve, conduits connecting said fluid coupling means to said differential pressure actuated means so that the differential pressure existing in said fluid coupling means when transmitting a manual force to said control surface through the cable transmission means will be applied to said differential pressure actuated means for controlling said valve.

10. In a system for supplying an assisting force to aid in positioning a control surface of an aircraft, a manually actuated member, fluid coupling means, means rigidly connecting said manually actuated member to said control surface through said fluid coupling means for transmitting push-pull forces thereto, said fluid coupling means including a pair of chambers, the fluid in one of said chambers being under a high pressure and the fluid in the other said chamber being under a low pressure when said forces are applied to said manually actuated member; differential fluid pressure actuated power means operatively connected to said control surface for supplying a force assisting said push-pull force, a supply source of fluid under pressure, valve means for controlling the flow of fluid from said supply source to said pressure differential actuated power means, valve operating means, means applying a first force proportional to the pressure differential in the high and low pressure chambers of said fluid coupling to said valve operating means and means for applying to said valve operating means a second and counter force proportional to the fluid pressure differential actuating said power means opposing the operation of said valve by said first force whereby the reaction of said control surface to the total forces applied thereto will be sensed by the operator through the application of a force to said manually actuated member which bears a fixed ratio to the total force.

11. In a system for supplying a booster force to position a control surface of an aircraft, a cable transmission loop having a manually operated control member, fluid coupling means, means connecting said loop to said control member through said fluid coupling means whereby the pressure in said fluid coupling will be increased as said control member is operated, a power cylinder having a movable power piston connected to the control surface for actuating the same, a fluid operated valve piston and valve casing therefor, a supply source of fluid under pressure, a low pressure return line therefor having a vent to atmosphere, conduit means for supplying fluid from said source to an inlet in said valve casing, outlet means connecting said valve casing to said low pressure return line, conduit means connecting said valve casing to said power cylinder at opposite sides of said power piston, conduit means connecting said fluid coupling means to said valve casing to apply fluid pressure to said valve piston whereby upon an increase in fluid pressure in said fluid coupling said valve piston will move within its casing to simultaneously connect said inlet to a conduit leading to one side of said power piston and said outlet to a conduit leading to the other side of said piston whereby a pressure differential will be supplied to said piston, and means exerting a back pressure on said valve piston proportional to the pressure differential of said inlet and outlet so that the resistance offered to its movement will be transmitted to the operator through said fluid coupling means and will bear a fixed ratio to the booster force supplied by said power cylinder.

12. In a system for supplying an assisting force to aid in positioning a control surface of an aircraft, the combination of means for manually applying a force to said control surface, a power cylinder having a fluid pressure actuated piston movable therein and operatively connected to said control surface to supply said assisting force, a pivoted supporting member, means pivotally securing said power cylinder to said supporting member, a latch for engaging said supporting member to retain the same in a fixed position immovable about its pivot whereby the fluid pressure acting on said piston will be delivered to said control surface, and means for disengaging said latch whereby said power cylinder and piston may then move as a unit with said pivoted supporting member when only said manually applied force is used to transmit a force to said control surface.

THOMAS WESSON MACOMBER.